(12) United States Patent
Sakaray et al.

(10) Patent No.: US 12,015,132 B2
(45) Date of Patent: Jun. 18, 2024

(54) COOLING SYSTEM AND METHOD FOR ENERGY STORAGE

(71) Applicant: Caterpillar Inc., Peoria, IL (US)

(72) Inventors: Umakanth Sakaray, Dunlap, IL (US); Nirag Sheth, Peoria, IL (US); Neil A. Terry, Edelstein, IL (US); Adam C. Grove, Washington, IL (US); John M. Tanner, Dunlap, IL (US); Jeremy Byrd, West Lafayette, IN (US); Gregory S. Hasler, Pekin, IL (US)

(73) Assignee: Caterpillar Inc., Peoria, IL (US)

(*) Notice: Subject to any disclaimer, the term of this patent is extended or adjusted under 35 U.S.C. 154(b) by 306 days.

(21) Appl. No.: 16/987,146

(22) Filed: Aug. 6, 2020

(65) Prior Publication Data

US 2022/0045376 A1 Feb. 10, 2022

(51) Int. Cl.
*H01M 10/613* (2014.01)
*F28D 21/00* (2006.01)

(52) U.S. Cl.
CPC ... *H01M 10/613* (2015.04); *F28D 2021/0043* (2013.01)

(58) Field of Classification Search
CPC ............. H01M 10/613; H01M 10/635; H01M 10/6568; F28D 2021/0043
See application file for complete search history.

(56) References Cited

U.S. PATENT DOCUMENTS

| | | | |
|---|---|---|---|
| 8,448,460 B2 | 5/2013 | Dogariu et al. | |
| 8,899,492 B2 | 12/2014 | Kelty et al. | |
| 10,279,647 B2 | 5/2019 | Tasiopoulos et al. | |
| 10,293,706 B2 | 5/2019 | Porras et al. | |
| 10,340,563 B2 | 7/2019 | Blatchley | |
| 2009/0317697 A1* | 12/2009 | Dogariu | B60H 1/00278 |
| | | | 429/62 |
| 2014/0214289 A1* | 7/2014 | Ott | F16H 59/78 |
| | | | 477/37 |
| 2016/0285144 A1* | 9/2016 | Song | H01M 10/48 |
| 2016/0351981 A1* | 12/2016 | Porras | H01M 10/635 |
| 2017/0317393 A1* | 11/2017 | Blatchley | H01M 10/6556 |

(Continued)

FOREIGN PATENT DOCUMENTS

WO 2020096786 A2 5/2020

OTHER PUBLICATIONS

Written Opinion and International Search Report for Int'l. Patent Appln. No. PCT/US2021/043819, dated Dec. 13, 2021 (11 pgs).

*Primary Examiner* — Adam A Arciero
(74) *Attorney, Agent, or Firm* — Bookoff McAndrews PLLC

(57) ABSTRACT

An energy storage device cooling system includes a housing, at least one energy storage device within the housing, and a coolant circuit including a first flow portion extending through the housing, the coolant circuit configured to supply coolant for heat exchange with the at least one energy storage device. The energy storage device cooling system also includes a chiller system including: a coolant supply, a heat exchanger, and an outlet in fluid communication with the first flow portion. The energy storage device cooling system also includes a controller configured to alter a function of the chiller system when a sensed temperature does not exceed a first temperature threshold.

20 Claims, 2 Drawing Sheets

(56) References Cited

U.S. PATENT DOCUMENTS

| | | | |
|---|---|---|---|
| 2018/0001784 A1* | 1/2018 | Porras | B60L 58/26 |
| 2018/0031251 A1 | 2/2018 | Smith | |
| 2018/0198173 A1* | 7/2018 | Ichikawa | H01M 10/625 |
| 2019/0190095 A1 | 6/2019 | Park et al. | |

* cited by examiner

COOLING SYSTEM AND METHOD FOR ENERGY STORAGE

TECHNICAL FIELD

The present disclosure relates generally to cooling systems, and more particularly, to cooling systems for energy storage devices and systems.

BACKGROUND

While diesel fuel is typically used to power land drilling rigs, natural gas is an attractive alternate option due to lower emissions, cost and widespread availability of natural gas produced at the drilling sites. However, unlike diesel-powered generator sets, the transient response of a natural gas engine generator or genset can be inadequate to accept large load changes associated with a drill rig, unless used with an energy storage system. An energy storage system or back-up energy source, for example, including lithium ion batteries, can be used to supplement power supplied to the rig when natural gas engines are unable to accept the load. The back-up energy source is designed to operate within a specific temperature range, and, therefore, may need to be heated when ambient temperature is low, and cooled when ambient temperature is high. In addition, as the back-up energy source generates heat during use, the back-up energy source may need to be cooled intermittently, as excess heat can degrade performance, safety, and operating life of the back-up energy source.

Conventional industrial refrigerated cooling systems may be useful for moderating temperature of back-up energy sources at elevated ambient temperatures. Industrial cooling systems are associated with various benefits, for example due to their availability, maturity, and cost, as well as the availability of trained service personnel. Typical applications of industrial refrigeration systems include machine tool cooling, medical equipment, plastic processing, and chemical fields, among others. While industrial cooling systems can be used with back-up energy sources, such industrial cooling systems may tend to reduce the temperature of some back-up energy sources below desired minimum operating temperatures (e.g., about 10 degrees Celsius). Such excessive cooling may adversely affect, for example, the useful life of batteries of the back-up energy source and is therefore undesirable. Moreover, industrial cooling systems are not typically designed to operate at extreme low temperatures which may be experienced in regions where the back-up energy sources are used, such as in drilling rigs or mining equipment. For example, electronic systems and associated hardware (e.g., materials) of cooling systems are not designed for extreme cold temperatures, such as temperatures of about −40 degrees Celsius.

An exemplary battery coolant circuit control is disclosed in U.S. Pat. No. 10,293,706 to Porras et al. (the '706 patent). The '706 patent describes a coolant system for a vehicle in which warm coolant is circulated to a radiator. A radiator-bypass loop allows coolant to skip the radiator, and instead direct coolant to a chiller loop, when the temperature of the battery exceeds a threshold. While the coolant system described in the '706 patent may be useful in some circumstances, it may be less useful for maintaining a desired temperature of a back-up energy source for a larger device (e.g., a device larger than a personal vehicle). Additionally, the coolant system described in the '706 patent may be unable to adequately regulate temperature of a back-up energy source when ambient temperatures are relatively low.

The disclosed method and system may solve one or more of the problems set forth above and/or other problems in the art. The scope of the current disclosure, however, is defined by the attached claims, and not by the ability to solve any specific problem.

SUMMARY

In one aspect, an energy storage device cooling system may include a housing, at least one energy storage device within the housing, and a coolant circuit including a first flow portion extending through the housing, the coolant circuit configured to supply coolant for heat exchange with the at least one energy storage device. The energy storage device cooling system may also include a chiller system including: a coolant supply, a heat exchanger, and an outlet in fluid communication with the first flow portion. The energy storage device cooling system may also include a controller configured to alter a function of the chiller system when a sensed temperature does not exceed a first temperature threshold.

In another aspect, an energy storage cooling system may include at least one energy storage device, an ambient temperature sensor configured to generate an ambient temperature signal indicative of a temperature outside of the at least one energy storage device, and a chiller system in fluid communication with the at least one energy storage device. The energy storage cooling system may also include a radiator system in fluid communication with the chiller system, a coolant circuit including a first flow portion for supplying coolant to the at least one energy storage device, a second flow portion for supplying the coolant to the chiller system, and a third flow portion for supplying the coolant to the radiator system, and a controller configured to control an operation of the chiller and an operation of the radiator system based on the ambient temperature signal.

In yet another aspect, a method for temperature control of an energy storage system may include supplying coolant from a chiller system to an interior of a housing of the energy storage system to control temperature of at least one energy storage device disposed within the housing, returning the supplied coolant to the chiller system, and detecting a temperature outside of the at least one energy storage device. The method may further include, when the detected temperature does not exceed a first temperature threshold, activating a function of a radiator system, and when the detected temperature is greater than a second temperature threshold, activating a function of the chiller system.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION

Both the foregoing general description and the following detailed description are exemplary and explanatory only and are not restrictive of the features, as claimed. As used herein, the terms "comprises," "comprising," "having," including," or other variations thereof, are intended to cover a non-exclusive inclusion such that a process, method, article, or apparatus that comprises a list of elements does not include only those elements, but may include other elements not expressly listed or inherent to such a process, method, article, or apparatus. Moreover, in this disclosure, relative terms, such as, for example, "about," "substantially," "generally," and "approximately" are used to indicate a possible variation of ±10% in the stated value. As used herein, a "sensed temperature" includes a temperature measured from one or more temperature sensors, as well as temperature information received from one or more external services, including weather services (e.g., over the internet). As such, a "sensed temperature" includes any information indicative of a temperature in a location or region associated with an energy storage device and/or an energy storage device cooling system. As used herein, an "ambient temperature sensor" refers to any device configured to measure, determine, and/or produce a signal indicative of an ambient temperature. As such, an "ambient temperature sensor" includes a device that directly measures temperature and generates a signal indicative of the directly-measured temperature, as well as devices that receive information indicative of an ambient temperature, including information received from one or more external services, including weather services.

Figure 1:
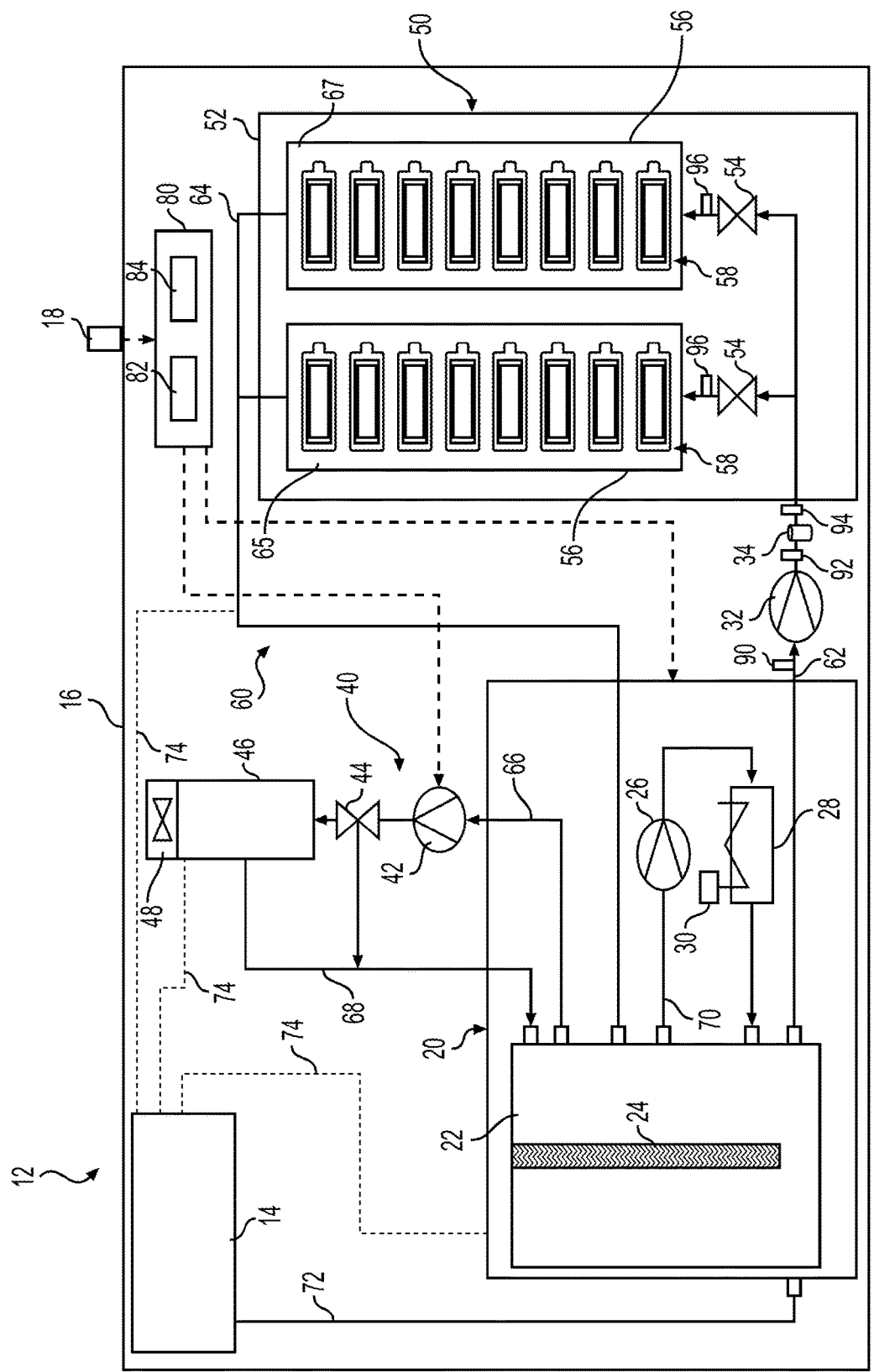
FIG. 1 is a diagram illustrating an energy storage unit cooling system according to an aspect of the present disclosure.

FIG. 1 is a diagram of an energy storage unit cooling system 12. Cooling system 12 may be useful for cooling a battery energy storage system (e.g., energy storage system 50) that is configured to receive and store energy generated by an internal combustion engine (not shown) or other energy generation device, and to provide stored energy to an electrical system for various commercial and/or industrial applications. Cooling system 12 may include a shunt tank 14, a chiller system 20, a radiator system 40, and aspects of energy storage system 50. Additionally, cooling system 12 may include a controller 80 and an ambient temperature sensor 18. Chiller system 20, radiator system 40, and energy storage system 50 may be in fluid communication with each other so as to receive coolant via a coolant circulation system 60. A system housing 16 may enclose the components of system 12, including one or more of shunt tank 14, chiller system 20, radiator system 40, and energy storage system 50. System housing 16 may facilitate mobility of cooling system 12 and may be part of, for example, a service vehicle, a trailer, or another suitable mobile system. Alternatively, system housing 16 may be a stationary structure configured to protect a permanently-installed cooling system 12.

Chiller system 20 may be a cooling refrigeration device configured to receive and output a liquid coolant such as a 50%-50% glycol-water mixture, a 60%-40% glycol-water mixture, or any other suitable coolant. A coolant tank 22 of chiller system 20 may form a reservoir or supply of the liquid coolant. An immersion heater 24 may be positioned within coolant tank 22 to generate heat to raise a temperature of coolant within tank 22. Chiller system 20 may include a chiller refrigeration system or cooling device 28 (e.g., a water-to-water heat exchanger) configured to reduce a temperature of the coolant. Cooling device 28 may circulate a refrigerant for heat exchange, and may include a refrigerant circuit having a compressor 30, a condenser (not shown), valve (not shown), and any other suitable components. These components may be configured to circulate refrigerant for reducing a temperature of the coolant, via heat exchange. Cooling device 28 may be configured to reduce and maintain the temperature of the coolant at a target temperature, such as 10 degrees Celsius.

Energy storage system 50 may include a housing or support structure 52 supporting one or more energy storage devices 58. Support structure 52 may include one or more racks, shelves, etc., supporting a plurality of rows of energy storage devices 58. Energy storage devices 58 may include a plurality of batteries housed in a shared coolant-receiving housing 56. Additionally or alternatively, each energy storage device 58 may include a battery secured within an individual housing 56. Housings 56 may be configured to receive coolant therein in a manner that facilitates heat exchange between the coolant and each energy storage device 58. Energy storage devices 58 may include lithium ion batteries having a desired operating temperature of, for example, from about 10 degrees Celsius to about 30 degrees Celsius. A plurality of the energy storage devices 58 may be electrically connected to each other in series or in parallel, as desired. For example, each energy storage device 58 in a particular row (two rows shown in FIG. 1) may be electrically connected to each other.

Radiator system 40 may include a radiator pump 42, radiator valve 44, radiator 46, and a variable-speed radiator fan 48 directed towards radiator 46. Radiator pump 42 may be an electronically-controlled pump in communication with controller 80. Radiator valve 44 may be positioned downstream of radiator pump 42. Radiator valve 44 may be a thermostatic valve having an inlet configured to receive coolant from radiator pump 42. Radiator valve 44 may include a plurality of outlets, including a first outlet for providing coolant to radiator 46 and a second outlet for bypassing radiator 46. Radiator 46 may be air-cooled for forced convection cooling, such that an amount of cooling may be controlled, at least in part, by a speed of radiator fan 48. Alternatively, radiator 46 may be a natural-convection radiator or a liquid-cooled radiator. Radiator 46 may include a plurality of fins to facilitate heat exchange between coolant and another fluid, such as air in the example of an air-cooled radiator.

Coolant circulation system 60 may include a series of coolant fluid passageways connecting the components of system 12 so as to form a coolant circuit with a plurality of paths. In the exemplary configuration illustrated in FIG. 1, coolant circulation system 60 includes a first flow portion 62 extending from a coolant output of chiller system 20 to an interior of energy storage system 50.

First flow portion 62 may include an output pump 32, a filter 34, and one or more balance valves 54. First flow portion 62 may include a plurality of parallel paths. In the exemplary configuration illustrated in FIG. 1, first flow portion 62 includes a first path 65 and a second path 67, which are fluidly coupled to each other as parallel paths of first flow portion 62. First path 65 and second path 67 may respectively cool individual rows of energy storage devices 58. While two paths for two rows of storage devices are described, any suitable number of paths and rows of energy storage devices 58 may be provided in first flow portion 62. When a plurality of paths is provided (e.g., two, three, four, or more paths), a flow balance valve 54 may be provided for each respective path, as shown in FIG. 1.

A second flow portion 64 may extend downstream of paths 65 and 67 of first flow portion 62. Second flow portion 64 may be configured to supply coolant to chiller system 20 from energy storage system 50. Second flow portion 64 may extend upstream of an inlet of chiller system 20, such as an inlet for coolant tank 22. Each of the plurality of paths, e.g., paths 65 and 67, may merge in the second flow portion 64 disposed fluidly between chiller system 20 and energy storage system 50.

A third flow portion 66 may extend downstream from an outlet of chiller system 20, such as an outlet of coolant tank 22, to supply coolant to radiator system 40. Third flow portion 66 may include radiator pump 42 and radiator valve 44 of radiator system 40, and may extend through radiator 46 to an outlet thereof. A fourth flow portion 68 may extend from the outlet of radiator 46, and additionally, from an outlet of radiator valve 44 to provide a flow path that bypasses radiator 46. Fourth flow portion 68 may extend to an inlet of chiller system 20, such as coolant tank 22, to provide a return path from radiator system 40 to chiller system 20.

A fifth flow portion 70 may extend within chiller system 20, so as to form a loop. In particular, fifth flow portion 70 may connect an outlet of coolant tank 22 and an inlet of coolant tank 22 to circulate coolant for chilling with use of the chiller refrigeration system. For example, fifth flow portion 70 may circulate coolant via heat exchanger pump 26, such that heat exchange may occur between the coolant and refrigerant circulated by cooling device 28, when cooling device 28 is activated.

Shunt tank 14 may be connected to chiller system 20 by a shunt tank line 72 configured to allow coolant to travel between shunt tank 14 and coolant tank 22. The shunt tank 14 may have a volumetric capacity sufficient to accommodate the expansion of coolant within system 12 and provide a return flow of coolant, when needed, without introducing air into the coolant supply. In addition to shunt tank line 72, shunt tank 14 may be connected to various components of coolant circulation system 60 via one or more vent lines 74. These vent lines 74 may allow shunt tank 14 to accommodate expansion of coolant that occurs in, for example, chiller system 20, radiator 46, and/or second flow portion 64.

A plurality of sensors 90, 92, 94, and 96 may be arranged at various locations of coolant circulation system 60 in order to monitor the operation of system 60. Each of sensors 90-96 may provide feedback information to controller 80. For example, a temperature sensor 90 may provide temperature feedback information indicative of the temperature of coolant within first flow portion 62 downstream of chiller system 20 and upstream of energy storage system 50. Pressure sensors 92 and 94 may be configured to generate signals indicative of the pressure at locations that are upstream and downstream, respectively, of filter 34. This feedback information may be useful to facilitate detection, via controller 80, of clogs within filter 34 (e.g., based on a pressure differential between sensors 92 and 94). Sensors 90-96 may be configured to communicate with, and provide feedback information to, controller 80, by any suitable wired and/or wireless communication. While sensors 90-96 are positioned at locations for monitoring conditions of coolant within first flow portion 62, one or more temperature or pressure sensors may be provided at any other portion of coolant circulation system 60. Signal lines between balance valves 54, sensors 90-96, and controller 80 are omitted from FIG. 1 for clarity.

Controller 80 may include at least one processor 82 and at least one memory 84. Processor 82 may be configured to read and execute programs stored in the memory 84 to generate and send electrical control signals to components of system 12, such as signals to control the operation of heat exchanger pump 26 and compressor 30 of chiller system 20, radiator pump 42 of radiator system 40, output pump 32, or balance valves 54. Processor 82 may be configured to control one or more operations of system 12 based on values stored in memory 84, such as threshold temperature values, when controlling these components of system 12. For example, memory 84 may store a chiller shutdown temperature threshold (e.g., a first temperature threshold) and a chiller restart temperature threshold (e.g., a second temperature threshold). In an exemplary configuration, the chiller shutdown temperature threshold may be about −15 degrees Celsius (about 5 degrees Fahrenheit), and the chiller restart temperature threshold may be about −3.9 degrees Celsius (about 25 degrees Fahrenheit). Alternatively, the chiller shutdown temperature may be about −13 degrees Celsius, or a temperature below about −10 degrees Celsius. Controller 80 may be in communication with ambient temperature sensor 18 to receive an ambient temperature signal generated by sensor 18. Controller 80 may be configured to compare the signal from sensor 18 to these thresholds and perform control of a component of chiller system 20 (e.g., compressor 30) and a component of radiator system 40 (e.g., radiator pump 42) based on the comparison. While a single controller 80 is illustrated in FIG. 1, controller 80 may be formed by a plurality of controllers 80 each including one or more processors 82 to generate and output control signals to one or more of heat exchanger pump 26, compressor 30, radiator pump 42, output pump 32, or balance valves 54.

INDUSTRIAL APPLICABILITY

Energy storage system 50 and energy storage unit cooling system 12 may be suitable for a wide range of applications. For example, energy storage system 50 may be applied in various commercial and industrial applications for functions such as peak shaving, load shifting, emergency backup, and other power supply or grid services. During use, energy storage system 50 may employ power electronics to convert DC power to AC power that is output to support these various operations, and, when not outputting power, may receive DC power that is stored by energy storage units 58. Whether power is being output by energy storage system 50 or received by energy storage system 50, heat may be generated (e.g., due to flow of current through the energy storage units 58). Cooling system 12 may remove generated heat to improve the efficiency and longevity of storage system 50 by maintaining each energy storage unit 58 within a desired range of operating temperatures.

During operation of energy storage unit cooling system 12, coolant may flow between chiller system 20, energy storage system 50, radiator system 40, and shunt tank 14. For example, coolant may exit from an outlet of chiller system 20 and may be supplied, via first flow portion 62, by pump 32 to energy storage system 50. The temperature and pressure of coolant traveling through first flow portion 62 may be evaluated by controller 80 according to signals generated by sensors 90-96. Contaminants within the coolant passing through first flow portion 62 may be removed by filter 34 before the coolant reaches energy storage units 58.

Coolant may be supplied to each row of energy storage units 58 via a balance valve 54 upstream of the row of storage units 58. Balance valve 54 may be an electronically-controlled valve configured to selectively resist or permit flow of coolant in response to control signals generated by controller 80 during the operation of system 12. In some aspects, controller 80 may control balance valves 54 to ensure that a substantially equal flow of coolant is provided to each of a plurality of flow paths (e.g., paths 65 and 67). However, controller 80 may also be configured to cause different amounts of coolant to be provided to each path. For example, when a temperature of energy storage units 58 within path 67 is higher than a temperature of energy storage units 58 within path 65, the valve 54 associated with the warmer path 67 may open to a greater degree as compared to the valve 54 associated with a cooler path 65, in accordance with control signals output by controller 80.

After exchanging heat with energy storage units 58, coolant may exit energy storage system 50 via a second flow portion 64 that returns this coolant to coolant tank 22. In some circumstances, temperature of coolant within tank 22 may be controlled by operating immersion heater 24 to increase a temperature of coolant or by operating cooling device 28. For example, immersion heater 24 may be activated to increase a temperature of coolant within tank 22 when the temperature of coolant, which may be measured by sensor 90 and/or one or more temperature sensors within chiller system 20, is colder than a predetermined desired operating temperature associated with energy storage units 58 (e.g., about 10 degrees Celsius). In circumstances where it is desirable to reduce the temperature of coolant, cooling device 28 may be activated.

Coolant may be supplied from tank 22 to radiator system 40 by third flow portion 66. In particular, coolant may be supplied to radiator system 40 by activating pump 42 with pump control signals generated by controller 80. Radiator valve 44 may distribute coolant to radiator 46 based on the temperature of the coolant. For example, radiator valve 44 may be a thermostatic valve including an element that is configured to permit flow of at least some coolant to radiator 46 when the coolant supplied to radiator valve 44 has a temperature equal to or higher than a predetermined start to open temperature (e.g., a temperature of about 12 degrees Celsius). Coolant that is supplied to radiator 46 by radiator valve 44 may be cooled by variable-speed radiator fan 48. The speed of radiator fan 48 may be adjusted by control signals generated by controller 80, and may be increased according to an increase in the temperature of the coolant, as determined by sensor 90 or one or more temperature sensors within chiller system 20, radiator system 40, or another suitable location. When coolant supplied to radiator valve 44 has a temperature that is lower than this radiator supply temperature, valve 44 may direct the coolant through an outlet that bypasses radiator 46, for example by supplying coolant directly to fourth flow portion 68.

Figure 2:
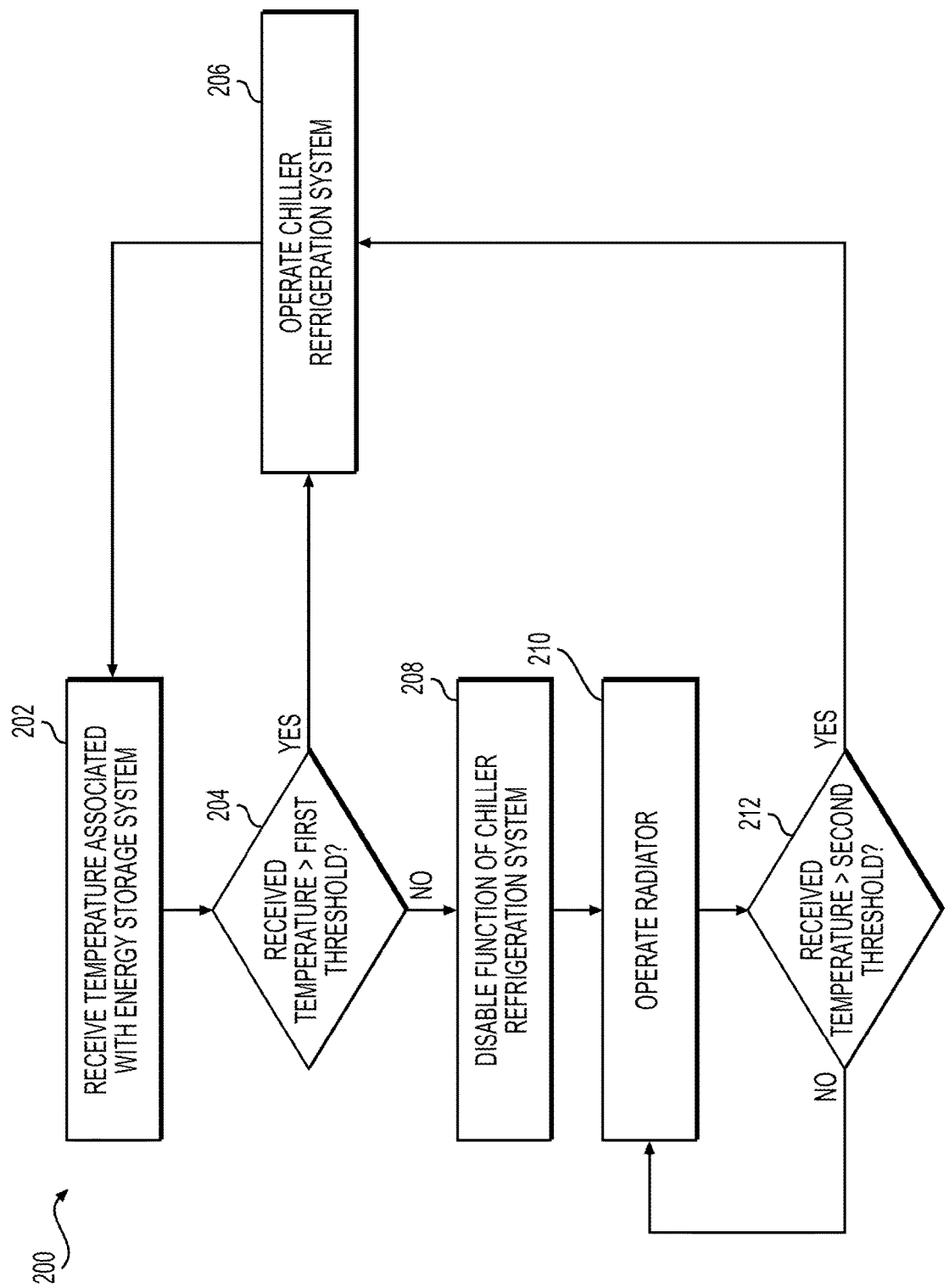
FIG. 2 is flowchart illustrating an exemplary method for temperature control of an energy storage system, according to aspects of the present disclosure.

FIG. 2 is a flowchart illustrating an exemplary process 200 for temperature control of energy storage system 50. Process 200 may facilitate temperature control of one or more energy storage units 58 and be employed at any desired time (e.g., on a continuous basis or an intermittent basis), as necessary or as desired. For example, process 200 may be employed to control a temperature of energy storage units 58 when units 58 are active and either receive energy or output energy. Additionally, process 200 may be performed when energy storage units 58 are inactive (e.g., on a hot or cold day). The temperature regulation performed by process 200 may be useful for maximizing the useful life of energy storage units 58 by avoiding overheating or overcooling.

In a step 202, a temperature associated with energy storage system 50 may be received by controller 80. The received temperature may be an ambient temperature of an environment of energy storage system 50 and/or of energy storage unit cooling system 12. For example, the received temperature may be obtained from ambient temperature sensor 18 in the form of an ambient temperature signal. Ambient temperature sensor 18 may be positioned outside of, or on an exterior of, system housing 16. In configurations where system housing 16 forms a housing of a service vehicle or a trailer, ambient temperature sensor 18 may generate a signal indicative of the ambient temperature outside of the service vehicle or trailer. If desired, ambient temperature sensor 18 may be placed within housing 16 to generate a signal indicative of the ambient temperature within the service vehicle or trailer.

A step 204 may include determining whether the temperature signal generated by ambient temperature sensor 18 and received in step 202 indicates that ambient temperature exceeds a first temperature threshold. The first temperature threshold may correspond to a chiller shutdown temperature threshold of, for example, about −15 degrees Celsius. In this example, when the received ambient temperature is warmer than −15 degrees Celsius, a step 206, which includes operating a chiller refrigeration system (e.g., a system for reducing a temperature of coolant of chiller system 20 such as cooling device 28), may be performed. In order to operate the chiller refrigeration system, controller 80 may output a signal to activate or otherwise operate at least one component of chiller system 20. In particular, controller 80 may output a compressor control signal that causes compressor 30 to operate, thereby compressing and circulating a cooled refrigerant that exchanges heat with coolant circulated within the loop formed by fifth flow portion 70. Additional components of cooling device 28, such as a condenser, expansion valve, and/or evaporator, may also be operated during step 206, e.g., in response to control signals from controller 80. During the operation of cooling device 28, the coolant may be circulated within fifth flow portion 70 so as to be cooled by refrigerant cycled through cooling device 28. In addition to the operation of cooling device 28, step 206 may include operating one or more components of chiller system 20 and/or other components of system 12, such as heat exchanger pump 26, output pump 32, valves 54, etc. During step 206, coolant that is chilled by cooling device 28 may be returned to coolant tank 22 to mix with coolant stored therein.

When the ambient temperature received in step 202 is below or does not exceed the first threshold, the determination in step 204 may be negative, and a step 208 may be performed. Step 208 may include disabling a function of the chiller refrigeration system, such as an operation of compressor 30. The function disabled in step 208 may include the operation of pump 26, or the operation of both compressor 30 and pump 26. By disabling compressor 30, controller 80 may be configured to cause the temperature of coolant to be maintained (i.e., not cooled by the heat exchanger of cooling device 28). When pump 26 is disabled, a flow of coolant may be prevented through fifth flow portion 70, which may also avoid reduction of the temperature of coolant by cooling device 28.

A step 210 may include operating a radiator, and in particular, radiator system 40. In one aspect, this may be accomplished by activating or otherwise operating radiator pump 42. Step 210 may include supplying coolant to radiator 46 by radiator valve 44 and driving radiator fan 48 based on the temperature of the coolant, ambient temperature, or both. Step 210 may also include bypassing radiator 46 by radiator valve 44 based on a temperature of the coolant. This may prevent overcooling of energy storage devices 58 and/or unnecessary cooling of coolant with radiator 46. In particular, a radiator valve 44 may cause an entirety of coolant to bypass radiator 46 at temperatures below a start to open temperature of, for example, about 12 degrees Celsius. Alternatively, the start to open temperature may be about 14 degrees Celsius. An entirety of coolant may be provided to radiator 46 at a fully-open temperature of about 18 degrees Celsius. At temperatures between the start to open temperature and fully open temperature, a portion of coolant may be provided to radiator 46 while a portion of coolant bypasses radiator 46, according to the position of radiator valve 44.

A step 212 may include repeating step 202 (e.g., including receiving an updated temperature) and determining whether this received temperature is greater than a second temperature threshold. This determination may be performed by controller 80, for example. The second temperature threshold may correspond to a chiller restart temperature threshold of, for example −3.9 degrees Celsius. When the received temperature does not exceed the second temperature threshold, step 210 may be repeated so as to continue operation of radiator system 40, as well as to maintain the disabled state of, for example, a chiller refrigeration system of chiller system 20.

Following a negative determination, step 212 may be repeated. In some aspects, following negative determinations, step 212 may be immediately repeated (e.g., by continuously monitoring and updating the received temperature) or may instead be intermittently repeated (e.g., by updating the received temperature after a predetermined time). When the received temperature is determined to exceed the second temperature threshold, radiator system 40 may be disabled (e.g., by discontinuing the operation of radiator pump 44) and step 206 may be performed so as to restart chiller refrigeration system. This may be performed by re-enabling one or more disabled components of chiller system 20, such as pump 26 and/or compressor 30.

In some aspects, the first temperature threshold discussed with respect to step 204 and the second threshold discussed with respect to step 212 may correspond to different temperatures. In order to prevent frequent transitions between the operation of the chiller refrigeration system formed by cooling device 28 and the operation of radiator system 40, it may be desirable to ensure that the second temperature threshold is at least 5 degrees Celsius warmer than the first temperature threshold. In other aspects, the second temperature threshold may be at least 8 degrees Celsius warmer than the first temperature threshold, or at least 10 degrees Celsius warmer than the first temperature threshold.

While ambient temperature sensor 18 has been described as being positioned outside of housing 16, in at least some aspects, ambient temperature sensor 18 may be placed within housing 16 to measure an ambient temperature within this housing 16. Alternatively, ambient temperature sensor 18 may be positioned at other suitable locations, including locations remote from energy storage system 50, such as a different location on a worksite, or a remote location having substantially the same ambient conditions as the location of energy storage system 50. Additionally, a temperature signal associated with energy storage system 50, including the above-described ambient temperature signal, may be received from an indirect temperature measurement, such as a temperature from a weather service indicative of the temperature at a location or region of energy storage system 50. Such indirect temperature measurements may be received by controller 80 over any suitable network.

Cooling system 12 may be useful in many types of energy storage systems, and may provide efficient liquid cooling for managing heat generated by energy storage devices 58 and associated power electronics. The inclusion of a chiller refrigeration system and a radiator-fan system as components of a single system 12, within a single container or housing, may facilitate efficient and reliable operation of a system that includes, for example, battery-based energy storage devices. Operation of the chiller refrigeration system may be suspended during operation of the radiator system (e.g., when the ambient temperature is relatively low) to avoid over-cooling of the energy storage devices. Such over-cooling may further be avoided with the use of a thermostatic valve included in the radiator system configured to allow at least some coolant to bypass the radiator according to the temperature of the coolant. Additionally, system 12 may be configured to provide substantially equal coolant flow rates across a plurality of racks or rows of energy storage devices, thereby allowing for uniform temperature gradients across the devices and ensure that the energy storage devices age at the same rate. For example, valves (e.g., flow balance valves 54) may be configured to supply substantially equal coolant flow rates to multiple rows or arrays of energy storage devices.

It will be apparent to those skilled in the art that various modifications and variations can be made to the disclosed method and system without departing from the scope of the disclosure. Other embodiments of the method and system will be apparent to those skilled in the art from consideration of the specification and practice of the method and system disclosed herein. It is intended that the specification and examples be considered as exemplary only, with a true scope of the disclosure being indicated by the following claims and their equivalents.

What is claimed is:

1. An energy storage device cooling system, comprising:
   a radiator;
   a housing;
   at least one energy storage device within the housing;
   a coolant circuit including a first flow portion extending through the housing, the coolant circuit configured to supply coolant to the radiator and for heat exchange with the at least one energy storage device;
   a chiller system including:
     a coolant supply;
     a heat exchanger; and
     an outlet in fluid communication with the first flow portion; and
   a controller programmed, via at least one memory associated with the controller, to deactivate a function of the chiller system when a sensed temperature does not exceed a first temperature threshold and while coolant is supplied to the radiator via the chiller system, the coolant supplied from the chiller system to the radiator bypassing the at least one storage device.

2. The energy storage device cooling system of claim 1, wherein the function of the chiller system includes a function of a compressor of the chiller system.

3. The energy storage device cooling system of claim 1, further including a radiator system, wherein the controller is configured to control a pump to deliver coolant to a radiator of the radiator system when the sensed temperature does not exceed the first temperature threshold.

4. The energy storage device cooling system of claim 3, wherein the radiator system includes a thermostatic valve device downstream of the pump.

5. The energy storage device cooling system of claim 1, wherein a first plurality of energy storage devices is provided in a first path of the first flow portion, a second plurality of energy storage devices provided in a second path of the first flow portion, and the first path and the second path are fluidly coupled to each other as parallel paths of the first flow portion.

6. The energy storage device cooling system of claim 5, further including a balance valve configured to adjust a flow of coolant to at least one of the first path or the second path.

7. The energy storage device cooling system of claim 1, wherein, after determining that the sensed temperature does not exceed the first temperature threshold, the controller is configured to reactivate the function of the chiller system when the sensed temperature is greater than a second temperature threshold.

8. The energy storage device cooling system of claim 7, wherein the second temperature threshold is a warmer temperature than the first temperature threshold.

9. The energy storage device cooling system of claim 7, wherein the second temperature threshold is at least 5 degrees warmer than the first temperature threshold.

10. An energy storage cooling system, comprising:
   at least one energy storage device;
   an ambient temperature sensor configured to generate an ambient temperature signal indicative of a temperature outside of the at least one energy storage device;
   a chiller system in fluid communication with the at least one energy storage device;
   a radiator system in fluid communication with the chiller system;
   a coolant circuit including a first flow portion for supplying coolant to the at least one energy storage device, a second flow portion for supplying the coolant to the chiller system, and a third flow portion for supplying the coolant to the radiator system such that an entirety of a coolant flow to the radiator system is received from the chiller system; and
   a controller configured to control an operation of the chiller and an operation of the radiator system based on the ambient temperature signal.

11. The energy storage cooling system of claim 10, wherein the controller is configured to reduce an amount of the supply of coolant to the second flow portion when an ambient temperature sensed by the ambient temperature sensor does not exceed a temperature threshold.

12. The energy storage cooling system of claim 10, wherein the controller is configured to control the operation of the radiator system by outputting a pump control signal to a radiator pump configured to supply coolant to the third flow portion.

13. The energy storage cooling system of claim 12, wherein the controller is configured to output the pump control signal when the ambient temperature signal corresponds to a temperature that does not exceed a first ambient temperature threshold.

14. The energy storage cooling system of claim 10, wherein the controller is configured to control the operation of the chiller by outputting a compressor control signal to a compressor of a heat exchanger of the chiller system.

15. The energy storage cooling system of claim 14, wherein the controller is configured to deactivate the compressor when the ambient temperature signal corresponds to a temperature that does not exceed a first ambient temperature threshold.

16. The energy storage cooling system of claim 15, wherein the controller is configured to reactivate the compressor when the ambient temperature signal corresponds to a temperature above a second ambient temperature threshold that is different than the first ambient temperature threshold.

17. A method for temperature control of an energy storage system, the method comprising:
   supplying coolant from a chiller system within an interior of a housing of the energy storage system to control temperature of at least one energy storage device disposed within the housing, the housing of the energy storage system containing a radiator system and the chiller system;
   returning the supplied coolant to the chiller system;
   detecting an ambient temperature outside of the at least one energy storage device and outside of the housing of the energy storage system, the ambient temperature being a temperature associated with a location of the energy storage system;
   when the detected ambient temperature does not exceed a first ambient temperature threshold, activating a function of a radiator system and deactivating a function of the chiller system; and
   when the detected ambient temperature is greater than a second ambient temperature threshold that is higher than the first ambient temperature threshold, activating the function of the chiller system such that the function of the chiller system is activated at an ambient temperature that is different from an ambient temperature at which the function of the chiller system was deactivated.

18. The method of claim 17, wherein the function of the chiller system is an activation state of a compressor of the chiller system.

19. The method of claim 17, wherein coolant is supplied to the radiator via the chiller system, the coolant supplied from the chiller system to the radiator while bypassing the at least one storage device.

20. The method of claim 17, wherein the housing of energy storage system is stationary when the energy storage system in use.

* * * * *